(12) United States Patent
Startsev et al.

(10) Patent No.: US 7,611,685 B2
(45) Date of Patent: Nov. 3, 2009

(54) METHOD FOR HYDROGEN SULPHIDE AND/OR MERCAPTANS DECOMPOSITION

(75) Inventors: Anatolii Nikolaevich Startsev, Novosibirsk (RU); Anastasia Viktorovna Pashigreva, Novosibirsk (RU); Olga Valeryevna Voroshina, Novosibirsk (RU); Ivan Ivanovich Zakharov, Novosibirsk (RU); Valentin Nikolaevich Parmon, Novosibirsk (RU)

(73) Assignee: Institu Kataliza Imeni G. K. Boreskova Sibirskogo Otdeleniya Rossiiskoi Akademii Nauk, Novosibirsk (RU)

(*) Notice: Subject to any disclaimer, the term of this patent is extended or adjusted under 35 U.S.C. 154(b) by 157 days.

(21) Appl. No.: 10/594,647

(22) PCT Filed: Mar. 31, 2005

(86) PCT No.: PCT/RU2005/000158
§ 371 (c)(1),
(2), (4) Date: Jul. 2, 2007

(87) PCT Pub. No.: WO2005/095265
PCT Pub. Date: Oct. 13, 2005

(65) Prior Publication Data
US 2007/0292337 A1     Dec. 20, 2007

(30) Foreign Application Priority Data
Apr. 1, 2004   (RU) .......................... 2004109969 U

(51) Int. Cl.
*C01B 3/02*   (2006.01)
*C01B 17/02*  (2006.01)
*C01B 17/04*  (2006.01)

(52) U.S. Cl. .................. 423/220; 423/230; 423/242.1; 423/243.01; 423/244.01; 423/244.09; 423/244.1; 423/573.1; 423/576.2; 423/576.8; 423/644; 423/658.2

(58) Field of Classification Search ................ 423/220, 423/230, 242.1, 243.01, 244.01, 244.09, 423/244.1, 573.1, 576.2, 576.8, 644, 658.2
See application file for complete search history.

(56) References Cited

U.S. PATENT DOCUMENTS

| | | | |
|---|---|---|---|
| 3,962,409 A | | 6/1976 | Kotera et al. |
| 4,280,990 A | * | 7/1981 | Jagodzinski et al. ...... 423/574.1 |
| 4,302,434 A | | 11/1981 | Hellmer et al. |
| 4,399,112 A | | 8/1983 | Voirin |
| 4,439,412 A | | 3/1984 | Behie et al. |
| 4,978,649 A | | 12/1990 | Surovikin et al. |
| 5,023,069 A | * | 6/1991 | Serrand ................... 423/574.1 |
| 5,047,216 A | * | 9/1991 | McDougall ................ 422/160 |
| 2005/0135983 A1 | * | 6/2005 | Geosits et al. ........... 423/242.1 |

FOREIGN PATENT DOCUMENTS

RU     2 216 506     11/2003

OTHER PUBLICATIONS

English Abstract of RU 2216506 Published Nov. 20, 2003.

* cited by examiner

*Primary Examiner*—Timothy C Vanoy
(74) *Attorney, Agent, or Firm*—Ladas & Parry LLP

(57) ABSTRACT

The inventive method for hydrogen sulphide and/or mercaptans decomposition consists in passing hydrogen sulphide and/or mercaptan-containing gas at a temperature less than 200° C. through a hard material layer (catalyst) which decomposes said hydrogen sulphide or mercaptans in such a way that hydrogen or hydrocarbons are released and sulphur-containing compounds are formed on a material surface. Said hard material is placed in a liquid medium layer. Said invention makes it possible to use a hard material (catalyst) without a periodical regeneration thereof.

3 Claims, No Drawings

METHOD FOR HYDROGEN SULPHIDE AND/OR MERCAPTANS DECOMPOSITION

BACKGROUND OF THE INVENTION

The invention relates to the field of gas and petroleum refining industry, in particular to methods for hydrogen sulphide and/or mercaptans decomposition and recycling hydrogen sulphide and mercaptans (thiols) and can be used for producing hydrogen and sulfur from hydrogen sulphide as well as for purification of gas mixtures from hydrogen sulphide and mercaptans.

Hydrogen sulphide is the major byproduct in petroleum industry and hydrometallurgy. It is present in large quantities (up to 50%) in gas-condensate fields of natural gas. It is the major product of many mineral and organic substance decomposition. At the same time hydrogen sulphide is a strong toxic substance causing poisoning of living organisms. Yet hydrogen sulphide can be a feed stock for producing valuable chemical product—hydrogen.

Mercaptans are byproducts of mineral and organic substances decomposition. They are present as admixtures in gaseous products of petroleum refinery. They can be present in gas-condensate fields of natural gas. Mercaptans are toxic substances with highly objectionable odor. Therefore off gases of industrial plants should be thoroughly cleaned of mercaptans. At the same time mercaptans are widely used as odorants of household gases to detect gas escape. Mercaptan presence in hydrocarbon gases leads to deactivation of catalysts used for conversion of these gases into valuable products. For that reason said gases should be purified from mercaptans.

Hydrogen sulphide is directly thermally decomposed into hydrogen and sulfur according to reaction:

$$H_2S \leftrightarrow H_2+S-Q \quad (1)$$

It is a strongly endothermic process and can have visible rate only at high temperatures. A method for thermal decomposition of hydrogen sulphide for obtaining hydrogen and sulfur is known. The method comprises passing hydrogen sulphide containing gas through a reaction zone at a temperature in the range from 850 to 1600° C. where decomposition of $H_2S$ results in obtaining hydrogen and sulfur, and consequent cooling of said gas to a temperature of 110-150° C. for condensing obtained sulfur (see U.S. Pat. No. 4,302,434, C01B 17/04, 24 Nov. 1981).

The known method has a few disadvantages: high temperature required for achieving high degree of hydrogen sulphide decomposition; high energy consumption for performing the reaction and compensating possible heat loss; potential decrease in decomposition level due to reverse interaction of hydrogen and sulfur on cooling; unsuitability of the method for treating gases containing hydrocarbons and other admixtures that can be pyrolyzed at high temperature; low effectiveness of the process when the concentration of hydrogen sulphide in the hydrogen sulphide containing feed decreases; requirements to use special expensive materials of high thermal resistance to form a high temperature reaction zone. What is more performing the hydrogen sulphide decomposition reaction at high temperature results in formation of gaseous sulfur consisting of high energy molecules $S_2$. It has adverse influence on the general thermodynamics of the process since it is known that producing products with less energy in condensed state (liquid or solid) is favorable for shifting reaction balance to formation of reaction products.

However it is possible to use catalysts for directing reaction (1) so that it can be performed at lower temperature.

Such possibility is disclosed in an invention (RU 2216506, C10B 17/04, 20 Nov. 2003) where hydrogen sulphide containing gas is passed through the layer of a solid catalytic material capable to decompose hydrogen sulphide according to reaction (1) at a temperature lower that 200° C., and regeneration is performed by supplying regenerating gas without hydrogen sulphide at a temperature at most 350° C. This method is the closest prior art.

A disadvantage of the known method is rather frequent regeneration of the solid material capable of decomposing hydrogen sulphide since obtained sulfur according to reaction (1) accumulates on its surface and block centers of hydrogen sulphide activation.

It is an object of the invention to provide a more effective method of hydrogen sulphide and/or mercaptans containing gases decomposition without frequent regeneration of the solid catalytic material.

SUMMARY OF THE INVENTION

This problem is solved by placing the solid material (the catalyst) in a layer of a liquid phase substance capable of dissolving intermediate reaction (1) products and/or sulfur forming on the surface of the catalyst.

DETAILED DESCRIPTION OF THE INVENTION

The method includes the following steps.

Hydrogen sulphide containing gas at initial temperature lower than 200° C. is passed through a layer of the solid material (the catalyst) capable of dissociative chemosorption of hydrogen sulphide at such temperatures. Conjugated chemosorption results in formation of gaseous hydrogen and sulfur containing intermediate products on the surface of the solid catalyst. The solid catalyst is placed in a liquid phase substance capable to dissolve intermediate products of reaction (1) and/or sulfur. The surface products of hydrogen sulphide decomposition dissolve and form either dissolved, or colloidal or solid elemental sulfur. Hydrogen discharged from the layer of the solid catalyst is collected or used for some purpose. The process of mercaptans decomposition is similar but the reaction products are a corresponding hydrocarbon and elemental sulfur.

After the catalyst surface is filled up with chemically sorbed sulfur compounds to such extent that active centers of dissociative chemosorption of hydrogen sulphide are getting blocked, the catalyst is heated to the boiling temperature of the liquid or lower but sufficient for removing surface compounds of elemental sulfur. If solubility of the surface sulfur compounds is not sufficient for catalyst reactivation, the liquid is replaced with another solvent that is better for dissolving surface sulfur compounds. Then the catalyst is returned in the layer of the liquid substance and the initial gas mixture is fed again.

The liquid substance can be selected from classes of substances listed below and/or combination of two or more liquid substances in any ratio: nonpolar substances, for example hydrocarbons, $CS_2$, etc.; polar substances, for example water, organic and inorganic acids, alkali solutions, olefin-type, dien-type, acetylene-type, naphten-type and aromatic-type hydrocarbons, salts of organic and inorganic acids, nitrogen-, oxygen-, chalcogen-, halogen-containing compounds and solutions of their salts, etc., and solutions of surfactants.

The main advantage of the inventive method is possibility to decompose hydrogen sulphide or mercaptans at a low temperature, for example at room temperature, while obtained sulfur does not accumulate on the catalyst surface dissolving in a liquid where the sulfur can be in solid form, a colloid or a dissolved substance depending on the nature of the liquid phase substance. In such way the catalyst surface is cleaned and the active component is regenerated.

Further the subject matter of the invention is illustrated by the following examples.

EXAMPLE 1

Natural gas comprising 3% by volume of hydrogen sulphide and nitrogen, carbon dioxide and water vapor is subjected to treatment. Said gas is passed at the temperature of 75° C. through a layer of a granulated graphite-like carbon material (U.S. Pat. No. 4,978,649, C10B 31/10, 18 Dec. 1990) placed in the layer of benzene. Gas discharged from said material layer comprises up to 3% of hydrogen as well as nitrogen, carbon dioxide and water vapor but no hydrogen sulphide. Intermediate sulfur compounds formed on the catalyst surface are dissolved in benzene, and as a result elementary sulfur S8 is obtained. As sulfur is poorly soluble in benzene it emerges on the surface of liquid benzene and can be removed using traditional methods.

EXAMPLE 2

Gas comprising 5% by volume of hydrogen sulphide as well as, nitrogen, oxygen and a mixture of light hydrocarbons is subjected to treatment. Said gas is passed at the temperature of 150° C. through a layer of molybdenum disulfate $MoS_2$ placed in the layer of liquid diesel oil. Gas discharged from said material layer comprises 5% by volume of hydrogen as well as nitrogen, oxygen and a mixture of light hydrocarbons but no hydrogen sulphide. Intermediate reaction (1) products formed on the catalyst surface are dissolved in diesel oil and form elementary sulfur which is poorly soluble in diesel oil and accumulates on the surface of liquid diesel oil.

EXAMPLE 3

Natural gas comprising 40% of hydrogen sulphide is subjected to treatment. Said gas is passed at the temperature of 40° C. through a layer of chemosorption catalytic material, cobalt sulphide $Co_xS_y$, placed on silica gel. This sorption-catalytic material is placed in the layer of a solution comprising 10% of diethanolamine in water. Natural gas discharged from the layer of the sulphide catalyst comprises up to 40% of hydrogen but no hydrogen sulphide. Surface intermediate reaction (1) products and obtained sulfur are soluble in the solution. As the solution is saturated with sulfur, forming elemental sulfur emerges to the surface and can be removed using known methods.

EXAMPLE 4

Gas consisting of mixture of synthesis gas ($CO+H_2$) and 1% of hydrogen sulphide is subjected to treatment. Said gas is passed at room temperature through a layer of sulphide catalyst $Co_xMo_yS_z$ deposited on aluminum oxide. Said catalyst is placed in the layer of a solution comprising 5% of monoethanolamine in water. Processed gas discharged from the layer of said material comprises CO and hydrogen but no hydrogen sulphide. Surface intermediate reaction (1) products and obtained sulfur are soluble in this solution. As the solution is saturated with sulfur, forming elemental sulfur emerges to the surface and can be removed using known methods.

EXAMPLE 5

Natural gas comprising methane, 5% by volume of hydrogen sulphide and 0.3% by volume of methylmercaptan (methanetiol) is subjected to treatment. Said gas is passed at room temperature through a layer of sulphide catalyst $Co_xMo_yS_z$ deposited on a porous carrier of aluminum oxide. Said catalyst is placed in the layer of concentrated ammonia. Processed gas discharged from the layer of said material comprises methane and hydrogen but no hydrogen sulphide. Surface intermediate reaction (1) products are soluble in this solution but obtained sulfur is poorly soluble in it. Therefore forming elemental sulfur emerges to the surface and can be removed using known methods.

EXAMPLE 6

Water saturated with hydrogen sulphide is subjected to treatment. Saturated aqueous solution of hydrogen sulphide is passed at the temperature of 20° C. through a layer of a graphite-like carbon material. Gas discharged from the layer has no hydrogen sulphide and hydrogen appears in the gaseous phase. Since intermediate reaction (1) products are poorly soluble in water and elemental sulfur is practically insoluble, sulfur accumulates on the surface of the graphite-like carbon material. In 40 minutes accumulated sulfur blocks the active surface of the carbon material and hydrogen sulphide begins to appear in the discharge. Then the supply of the saturated aqueous solution of hydrogen sulphide is discontinued and the layer of the graphite-like carbon material is placed in the layer of liquid hydrazine hydrate at room temperature. Surface intermediate reaction (1) products and obtained elemental sulfur are soluble in liquid hydrazine hydrate, and in 5 minutes hydrazine hydrate is poured out, and saturated aqueous solution of hydrogen sulphide is supplied again. After the surface of the graphite-like carbon material is saturated with sulfur again, the material is placed in the layer of hydrazine hydrate. Such combination of chemosorption catalytic stage and catalyst reactivation stage is repeated many times without decreasing catalyst capacity.

As it follows from the examples the method according to the present invention provides for decomposing hydrogen sulphide and mercaptans at low temperature, for example at room temperature, wherein obtained sulfur is not accumulated on the catalyst surface but passes into a liquid and can be in the form of solid substance, colloid or dissolved substance depending on the nature of the liquid. In such way the catalyst surface is cleaned and the active component is regenerated. Thus in the method according to the present invention there is no need for frequent reactivation and regeneration of the used solid material (the catalyst).

What is claimed:

1. A method for producing hydrogen and sulphur from a gas containing hydrogen sulphide and/or a mercaptan, said method comprising passing said gas at a temperature lower than 150° C. through a layer of a solid material capable of decomposing hydrogen sulphide and/or mercaptans with isolation of hydrogen or hydrocarbons and formation of sulfur-containing compounds on the surface of the material, characterized in that said solid material is placed in a layer of a liquid phase substance which is capable of dissolving intermediate reaction products and/or sulphur forming on the surface of the solid material.

2. The method as claimed in claim 1, wherein said gas is passed at a temperature of 75° C. or below.

3. The method as claimed in claim 1, wherein said liquid phase substance is selected from the group consisting of hydrocarbons, carbon disulphide, water, organic acids, inorganic acids, surfactant solutions and mixtures thereof.

* * * * *

UNITED STATES PATENT AND TRADEMARK OFFICE
CERTIFICATE OF CORRECTION

PATENT NO. : 7,611,685 B2  Page 1 of 1
APPLICATION NO. : 10/594647
DATED : November 3, 2009
INVENTOR(S) : Anatolii Nikolaevich Startsev et al.

It is certified that error appears in the above-identified patent and that said Letters Patent is hereby corrected as shown below:

Item (73), Assignee:   "Institu" should read --Institut--
                       "Otdeleniya" should read --Otdelenia--

Signed and Sealed this

Sixteenth Day of March, 2010

David J. Kappos
*Director of the United States Patent and Trademark Office*